June 5, 1928.
J. D. WALLACE ET AL
1,672,238
ELECTRIC HAND SAW
Filed Aug. 13, 1926    4 Sheets-Sheet 1
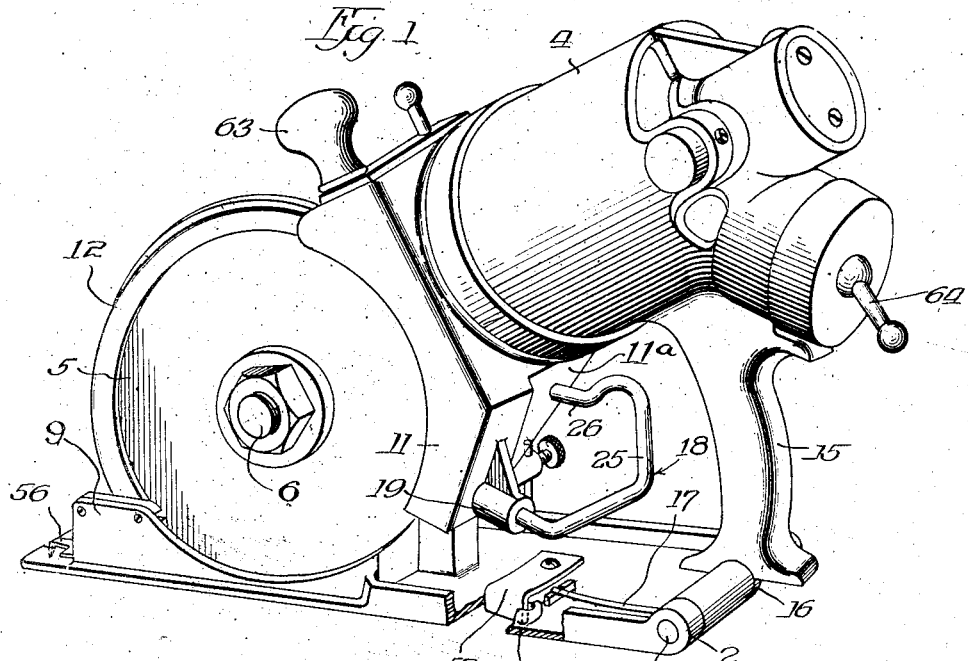
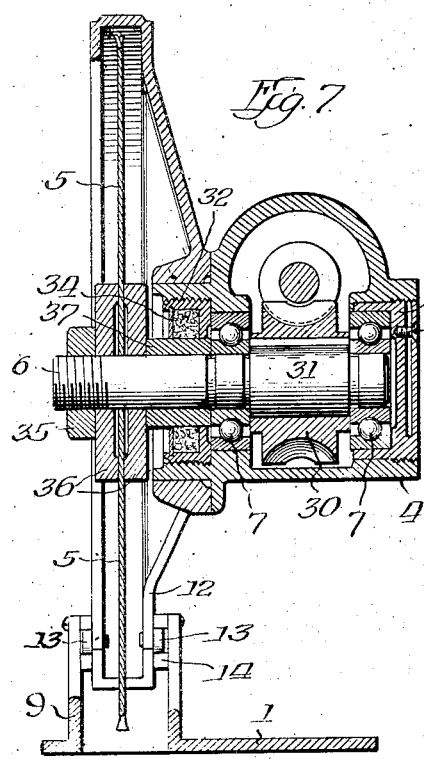

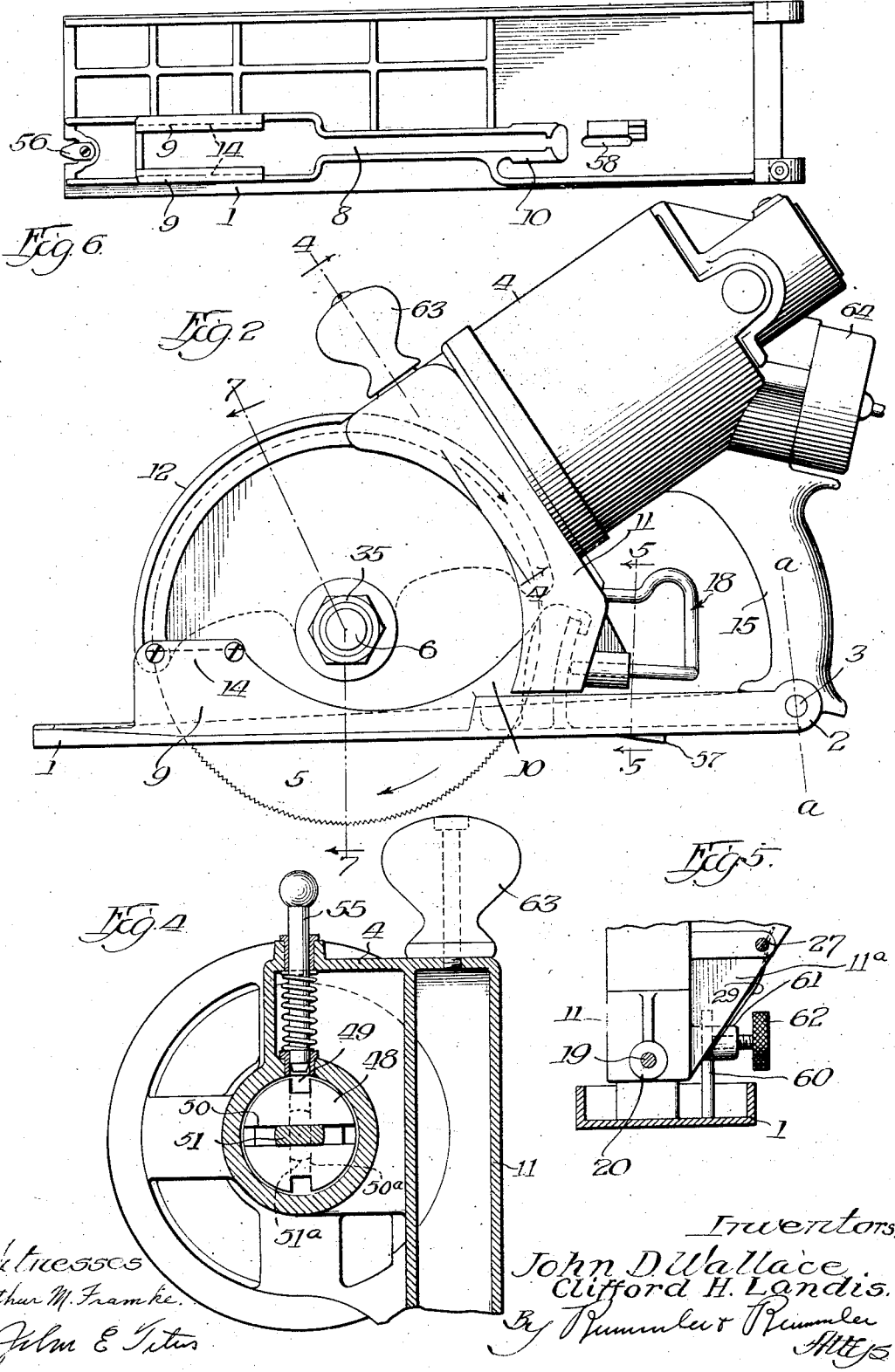

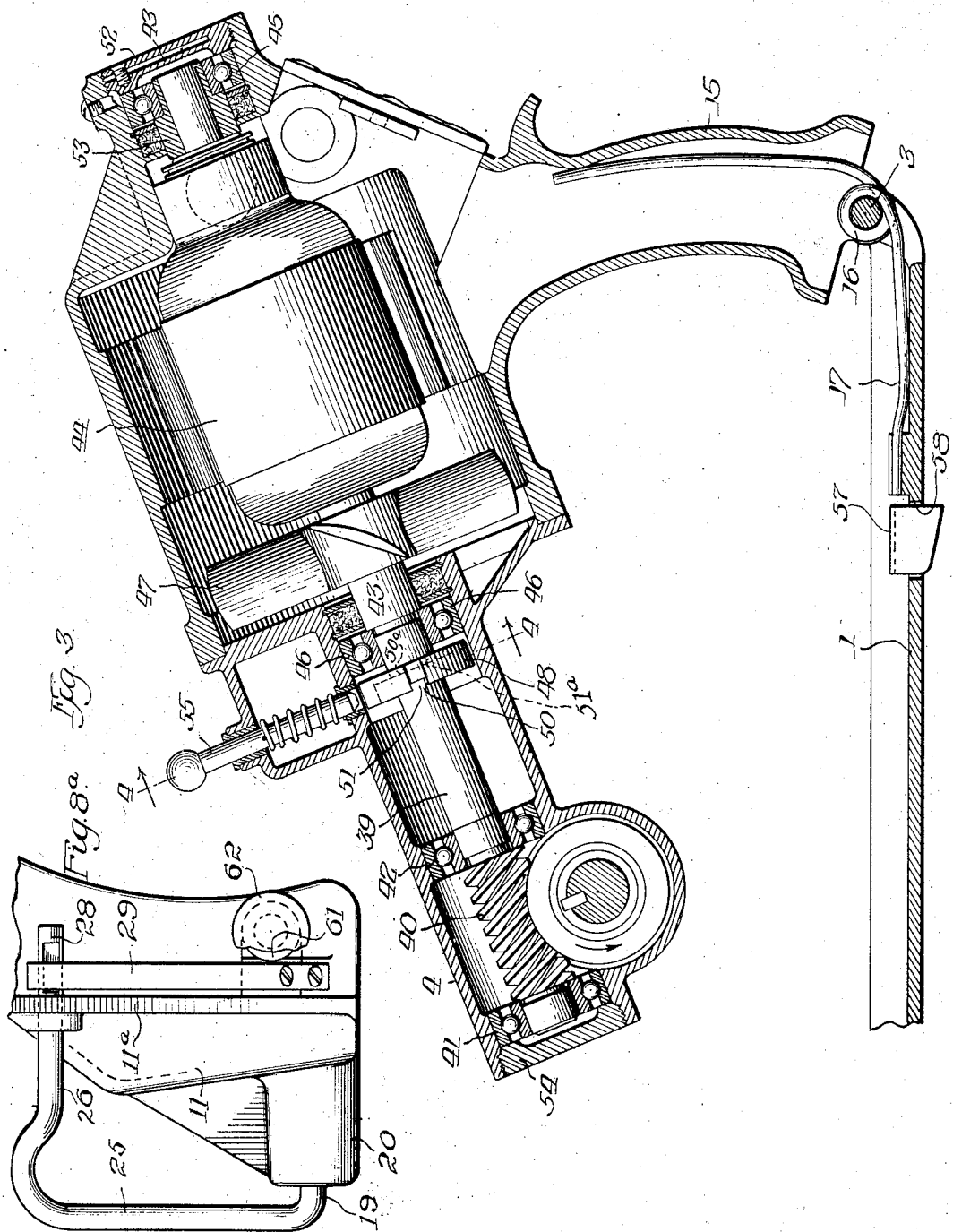

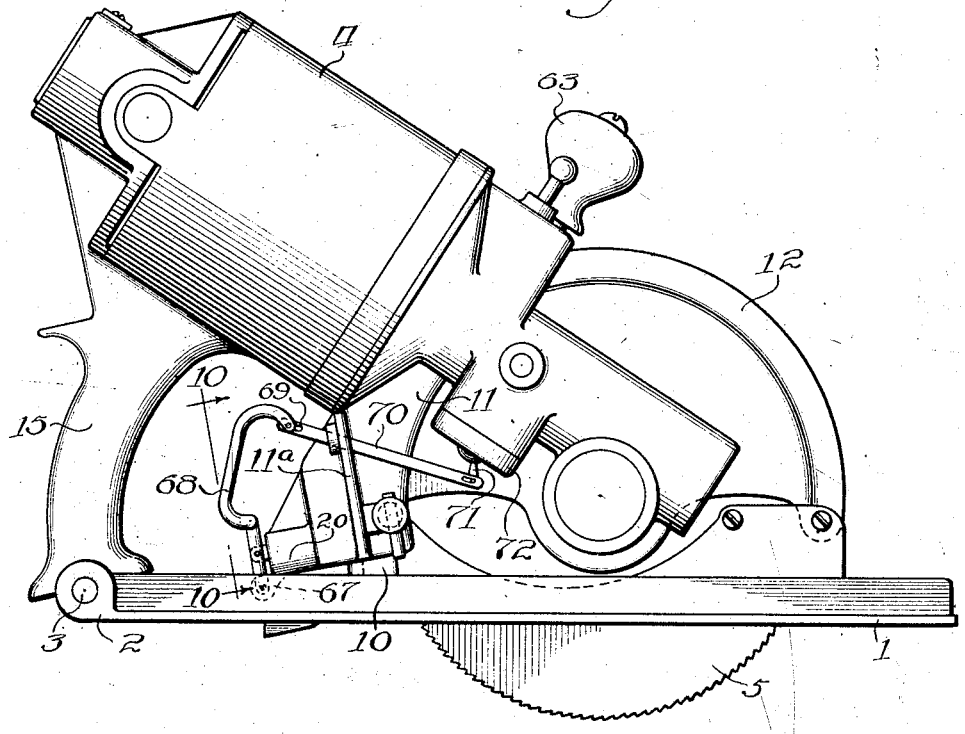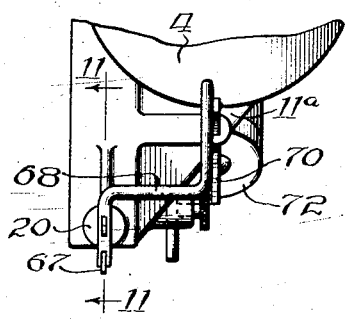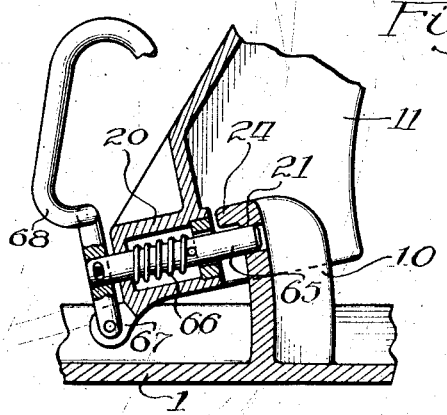

Patented June 5, 1928.

1,672,238

UNITED STATES PATENT OFFICE.

JOHN D. WALLACE AND CLIFFORD H. LANDIS, OF CHICAGO, ILLINOIS, ASSIGNORS TO J. D. WALLACE & COMPANY, A CORPORATION OF ILLINOIS.

ELECTRIC HANDSAW.

Application filed August 13, 1926. Serial No. 128,960.

This invention relates to improvements in power driven hand saws for cutting boards and the like and is chiefly characterized by having a saw hinged on a base adapted to be slid over the surface of the work with one hand while the other hand depresses the saw so as to project the same through the board.

The saw is resiliently raised above the base and an automatic lock and suitable guards are provided so that no part of the saw is exposed while the device is not being used for cutting. Heretofore automatic saws have been provided with rigid supports for guiding the saw over the work, but when the saw is lying idle, while the motor is running, the operator is liable to come into contact with the saw, or some object may be moved against the exposed saw, which revolves at a very high speed, and may either break the saw or otherwise cause damage.

The main objects of this invention are to provide a power driven hand saw which may be operated in an easy and natural manner, similarly to the operation of a jack plane and like tools; to provide a saw which is safe to handle, with all the movable parts fully protected while the saw is not being used; to provide a trigger controlled automatic latch for locking the saw in unlimbered position and to provide means for regulating the maximum depth of the cut. Other objects are to provide a hand saw in which the saw disc is readily removable; and to provide improved means for controlling the operation of the saw.

An illustrative embodiment of the invention is shown in the accompanying drawings, in which:

Figure 1 is a perspective view of the power driven hand saw in normal or unlimbered position.

Fig. 2 is a side elevation of the device with the saw depressed for cutting.

Fig. 3 is a vertical section taken on a plane through the axis of the motor shaft.

Fig. 4 is a section on the line of 4—4 in Fig. 3.

Fig. 5 is a fragmentary view taken on the line 5—5 of Fig. 2.

Fig. 6 is a plan view of the base member.

Fig. 7 is taken substantially on the line 7—7 of Fig. 2, with the saw in raised position.

Fig. 8 is a vertical section through the latch mechanism shown in Fig. 1 and Fig. 2.

Fig. 8a is the reverse of Fig. 8 showing a fragment on a larger scale.

Fig. 9 shows a modified form in which the motor switch is connected to the trigger latch.

Fig. 10 is taken on line 10—10 of Fig. 9.

Fig. 11 is a section taken substantially on line 11—11 of Fig. 10.

In this invention a circular saw is mounted in the swinging end of a frame to which is hinged a base or shoe for sliding over the work. The motor is enclosed in the frame and drives the saw through a suitable worm gearing.

A guard is pivotally mounted on the saw axis for covering the exposed edges of the saw above the base and is provided with pins which slide in slots in the base so that the guard is rotated and held from following when the frame is depressed to project the saw. A handle is provided at the back end of the frame for moving the saw back and forth over the work and as second handle is provided on the top of the frame for guiding the saw. The shoe is resiliently rotated about its pivot to swing the shoe below the edge of the saw when the device is lifted; and a lock, controlled by a trigger in proximity to the rear handle, is provided for automatically locking the frame in raised position.

In the drawings, the base or shoe 1 is a light flat casting suitably ribbed on the upper surface for strengthening and providing stiffness. Spaced lugs 2 are formed on the back end of the base for receiving the rod 3, upon which the saw frame 4 is hinged. The saw disc 5 is removably mounted on an arbor 6, which is rotatably mounted in the ball bearings 7 secured in the swinging end of the frame 4, to which the shoe 1 is movably attached.

A slot 8 is provided in the base 1 for the saw disc, and guard projections 9 and 10, for shrouding the lower end of the saw in raised position, are provided around the slot. The back of the saw is covered by a hood 11 which is integral with the frame 4, and is adapted to receive the end of the movable guard 12. The guard 12 is rotatably mounted on the frame 4, concentric with the saw arbor 5, and the lower end of the guard 12 is provided with pins 13 at either side, which engage in horizontal grooves 14 provided in the inner faces of the guard flanges 9 which are integral with the shoe 1.

The downwardly extending leg portion 15 of the saw frame 4 is formed into a hollow handle, and the pivot shaft 3 passes through the lugs 16 on the lower end of the handle. A coil spring 17 is wound about the shaft 3 with one end engaging the shoe and the opposite end projecting into the handle portion 15, as shown in Fig. 3. The spring 17 serves to resiliently press the shoe downward, and tends to lift the frame.

A trigger 18 consists of a looped rod having one end 19 slidable in a boss 20, in the lower end of the hood 11, and urged forwardly to engage in a hole 21 formed in the upstanding portion 10 of the base by means of a spring 22, which bears against a pin 23 in the bolt or rod portion 19, and seats in the outer end of the boss 20.

A stop 24 is provided above the hole 21 and engages the end of the bolt 19 to normally limit the upward movement of the saw. The middle portion 25 of the trigger 18 is bent inwardly and upwardly to provide a portion conveniently adjacent to the handle 15, and the upper end 26 is bent forwardly and projects through a hole 27 in the web 11ª of the frame portion 11.

The end 26, projecting through the web 11ª, is provided with a notch 28 at the side, in which is loosely engaged the end of a latch spring 29, the lower end of which is attached to the hood 11 as shown in Fig. 8ª. The spring latch 29 allows the trigger sufficient movement so that the end 19 may be disengaged from the hole 21, but prevents the end from being withdrawn beyond the stop 24 when using the saw.

When it is desired to remove the saw disc, the spring latch 29 is pulled out of engagement with the notch 28, which allows the trigger to be retracted to permit the end 19 to pass the stop 24. This allows the shoe 1 to fly open. The pins 13 in the guard slide out of the grooves 14 and the guard 12 may then be rotated clear of hood 11, and comes off with saw blade, a condition necessary for removal of that part.

As shown in Fig. 7 the saw arbor 6 carries a worm gear 30 which engages between the inner races of the ball bearing 7, which abut against an enlarged portion on the shaft 6. The outer races of the ball bearings are each locked inwardly by means of threaded collars 32 and 33 so that lateral motion is prevented. A felt washer 34 is secured in the collar 32 to protect the bearings from dust and the saw 5 is locked on the shaft by means of a hexagonal nut 35, which presses the collars 36, on either side of the saw, against the abutment provided by the inner race of the adjacent bearing, through the spacing sleeve 37, between the bearing and the inner one of the collars 36. The outer collar 33 is locked in the position in the frame 4 by means of a screw 38.

A shaft 39, having a worm 40, is mounted above and in transverse relation to the arbor 6, with the worm engaging in the worm gear 30. The shaft 39 is carried in the ball bearings 41 and 42 in the frame 4. The armature shaft 43 of the motor 44 is carried between a fixed ball bearing 45 at the rear end of the frame, and a floating bearing 46 near the forward end. The fan 47 is mounted on the armature shaft 43 to cause an air circulation through the motor housing.

A coupling disc 48 is provided with peripheral notches 49 and slots 50 and 50ª at right angles on the opposite faces. A tongue 51 on the end of the worm shaft 39 engages with the slot 50 and a tongue 51ª on the end of the armature shaft 43 engages in the slot 50ª. The outer race of the rear bearing 45 is locked inwardly by means of the threaded member 52, and the inner race bears against a shoulder bushing 53, fast on the rear end of the armature shaft 43. At the lower end, the shoulder, furnished by the lower end of the worm portion 40 bears against the inner race of the bearing 41, the outer race of which is locked inwardly by the collar member 54, threaded into the frame 4.

To facilitate tightening or loosening the arbor nut 33, the shafts are held from rotating by depressing the spring raised plunger 55, Fig. 4, mounted in the frame 4, to engage the plunger in the notch 49 in the armature shaft collar 48.

For convenience in operating, a guide or index 56 may be provided on the forward edge of the base 1 for following the mark for the cut. Also a yieldable finger 57 is provided for engaging in the saw cut. The member 57 is resilient and the transverse portion is secured at one end to the upper surface of the base 1, while the free end is bent downwardly and projects through a slot 58 in the base, immediately behind the saw. When the device is set onto a smooth surface the downwardly projecting end of the finger 57 is pressed upwardly into the slot, but as soon as a cut is made the end springs down into the kerf made by the saw and engages the side walls thereof to provide a guide for holding the rear end of the saw frame against transverse movement, so that a straight line cut can be easily made. The rear end of the finger 57 is made pointed as shown to dig into the surface of the work when a cut is first started on a flat surface inward from the edge thereof to prevent the saw from being moved backward, when the power is first turned on to the saw.

An adjustable stop is provided for limiting the saw projection and the depth of the cut. This stop comprises a rod 60, which is mounted in a projection 61 on the lower end of the frame portion 11. The rod 60 contacts with the base 1, when the saw is depressed and may be locked in any desired position by means of the thumb screw 62 which threads into the projection 61 to engage with the rod 60 therein.

When it is desired to use the saw the operator grasps the handle 15 and the knob 63 provided on the top of the swinging frame 4. The motor is put in operation by means of the switch 64. As the operator shoves the base of the device forwardly over the surface of the work, he grasps the trigger member to unlock the saw frame, to release the saw to feed down into the work. Whenever the operator lifts the device off the work, the spring 17 at once swings the shoe out, and the latch provided by the bolt 19 snaps into the hole 21.

It is manifest that the device can be operated in an easy and natural manner, the depth of the cut regulated as desired, or that the stop 61 may be set to cut at a fixed depth. When the saw is lowered the lugs 13, sliding in slots 14, cause the guard 12 to rotate about the axis of the saw and the upper end of the guard telescopes into the channel portion 11. This keeps the upper edge of the saw covered at all times without requiring a clumsy unwieldly guard and without changing the upper contour of the device, which change would tend to interfere with the operator's judgment in guiding and handling the saw.

The motor switch may also be interconnected with the latch as shown in Figs. 9, 10 and 11. Then when the saw frame is released the motor is simultaneously put in operation, and when the device is taken out of the work the motor is automatically shut off, because the spring 17 throws the shoe 1 to the outer position where it is automatically locked and effects the movement of the latch member for shutting off the motor.

Referring to the last three figures, the plunger 65 is mounted in the boss 20 on the lower end of the hood portion 11 of the saw frame 1; and the plunger 65 is pressed forwardly by means of the spring 66 to engage in the hole 21 in the projection 10 of the shoe 1, in the same manner as the latch end 29 shown in the preceding figures.

Lugs 67 are provided on the boss 20, in which is pivoted the lower end of the irregularly formed trigger 68. The outer end of the plunger 65 is pivotally connected to the trigger, and the upper end of the trigger is pivotally connected into the slot 69, in the outer end of the rod 70 which extends loosely through the frame web 11$^a$ and is loosely attached to the switch lever 71 of the motor switch 72, which in this case is mounted on the frame 4 on the under side of the portion which houses the worm shaft 39.

This arrangement provides ample motion for operating the switch arm 71 in connection with the short movement for withdrawing the plunger 65 to release the saw frame. For withdrawing the plunger beyond the stop 24, to open up the shoe 1, the rod 70 may be disconnected.

While illustrative embodiments of this invention have been shown and described many omissions and alterations may be made without departing from the spirit of the invention, as defined in the following claims.

We claim:

1. In a device of the class described, a shoe, a saw frame movably attached to the shoe and resiliently pressed upward from the shoe, a circular saw rotatably mounted in said frame, a motor carried by the frame and geared for driving said saw, and a saw guard pivotally mounted on the axis of the saw and slidably engaged with the shoe.

2. In a power hand saw, a frame, a saw disc, a motor for driving the disc, said disc and motor mounted in the frame, a shoe hinged to the frame and resiliently pressed outwardly to cover the saw disc, a spring pressed latch mounted in the frame and engageable with the shoe to hold the shoe in the outward position, a motor switch mounted on the frame, and a trigger mounted in the frame and operatively connected to said latch and said switch.

3. In a portable power driven hand tool adapted to be applied bodily to the work and moved along the same by the operator, a frame and cutting blade operatively mounted thereon, a motor for operating said blade, a bearing shoe attached to the frame for contacting with and sliding over the work, and a finger yieldably mounted on said shoe, said finger being adapted to engage in the surface of the material being cut to prevent backward movement when a cut is first started at a point inward from the edge thereof.

Signed at Chicago this 10th day of August, 1926.

JOHN D. WALLACE.
CLIFFORD H. LANDIS.